(12) United States Patent
Ikeda et al.

(10) Patent No.: US 12,380,043 B2
(45) Date of Patent: Aug. 5, 2025

(54) DATA TRANSFER DEVICE AND DATA TRANSFER METHOD

(71) Applicant: RENESAS ELECTRONICS CORPORATION, Tokyo (JP)

(72) Inventors: Motoshige Ikeda, Tokyo (JP); Yuuji Inae, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 18/163,585

(22) Filed: Feb. 2, 2023

(65) Prior Publication Data

US 2023/0297530 A1    Sep. 21, 2023

(30) Foreign Application Priority Data

Feb. 14, 2022    (JP) ................................. 2022-020459

(51) Int. Cl.
  *G06F 13/24*    (2006.01)
  *G06F 13/32*    (2006.01)
  *G06F 13/362*   (2006.01)

(52) U.S. Cl.
  CPC .......... *G06F 13/32* (2013.01); *G06F 13/3625* (2013.01)

(58) Field of Classification Search
  None
  See application file for complete search history.

(56) References Cited

U.S. PATENT DOCUMENTS

| | | | |
|---|---|---|---|
| 9,118,586 B2* | 8/2015 | Dropps | H04L 49/357 |
| 2004/0062129 A1* | 4/2004 | Novick | G11C 11/4087 |
| | | | 365/230.03 |
| 2008/0109571 A1* | 5/2008 | Lee | G06F 13/28 |
| | | | 710/22 |
| 2017/0366465 A1* | 12/2017 | Mutoh | H04L 47/225 |
| 2021/0056058 A1* | 2/2021 | Lee | G06F 13/4221 |

FOREIGN PATENT DOCUMENTS

| | | |
|---|---|---|
| JP | 2007-18266 A | 1/2007 |
| JP | 2008-287490 A | 11/2008 |

OTHER PUBLICATIONS

Office Action dated Jun. 17, 2025, issued in corresponding Japan Patent Application No. 2022-020459, 9 pages.

* cited by examiner

*Primary Examiner* — Henry Tsai
*Assistant Examiner* — Dean Phan
(74) *Attorney, Agent, or Firm* — Rimon P.C.

(57) ABSTRACT

A data transfer device that divides and transfers the transfer target data in a burst manner from a transmission-side device to a reception-side device includes a storage device and a control device that controls the storage device to store one piece of the input transfer target data, controls the storage device so that data transfer is performed at a set burst length as a data length of divided data when the one piece of the data is divided by a division number until a last part of the data is sensed, and when the last part of the data is sensed, controls the storage device to adjust the burst length so that a data length of the data coincides with a total of data lengths of data to be transferred, and to transfer the data at the adjusted burst length.

5 Claims, 8 Drawing Sheets

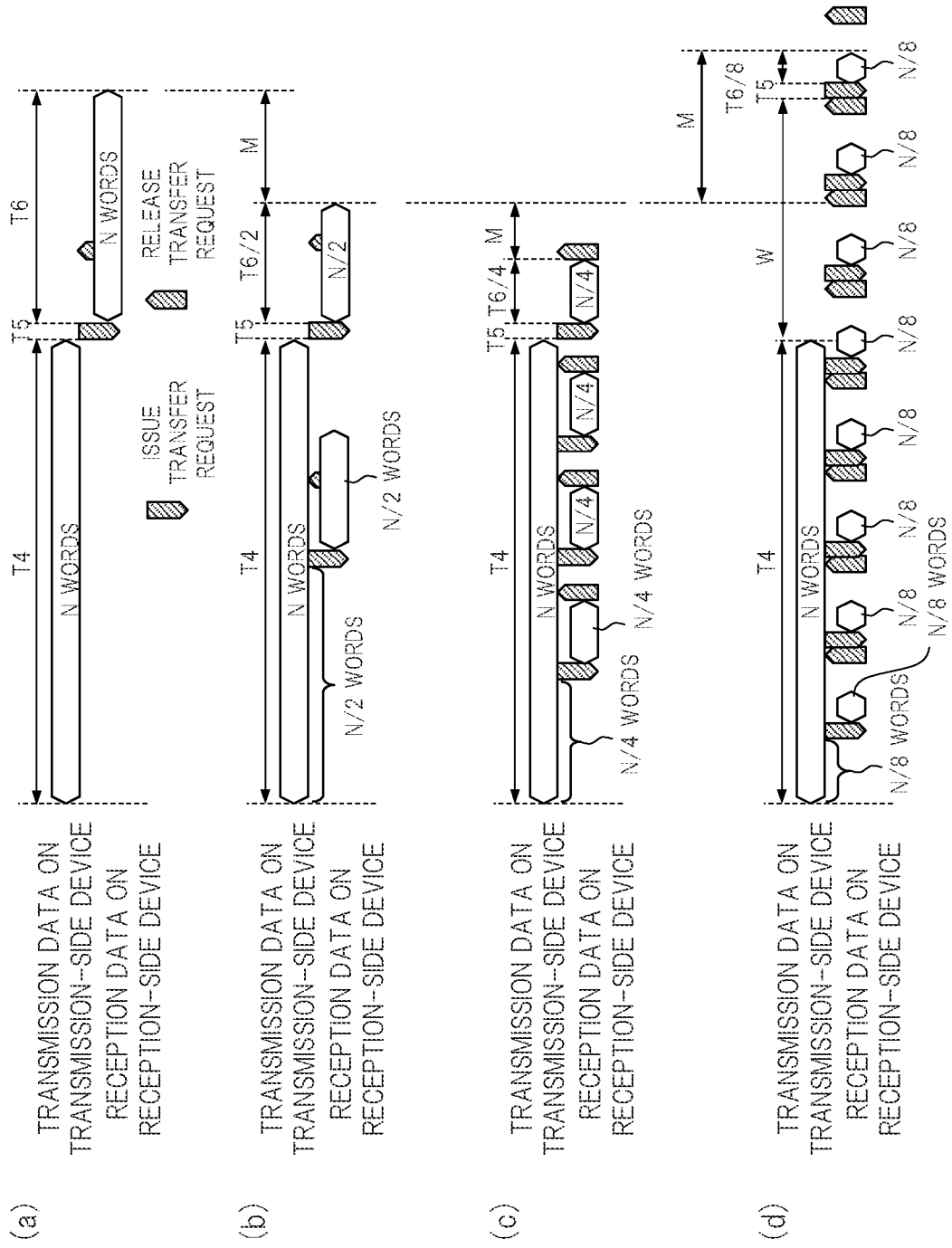

DATA TRANSFER DEVICE AND DATA TRANSFER METHOD

CROSS-REFERENCE TO RELATED APPLICATIONS

The disclosure of Japanese Patent Application No. 2022-020459 filed on Feb. 14, 2022 including the specification, drawings and abstract is incorporated herein by reference in its entirety.

BACKGROUND

The present invention relates to a data transfer device and a data transfer method.

A variety of technologies related to speed enhancement or efficiency enhancement of data transfer in a semiconductor device have been disclosed. For example, there is disclosed a technique listed below.

[Patent Document 1] Japanese Unexamined Patent Application Publication No. 2008-287490

Patent Document 1 discloses a data transfer device that transfers data in a burst manner by using a storage unit as a buffer between a transmission-side device and a reception-side device, between which an operating speed is different. This data transfer device includes the storage unit and a control unit. The control unit controls the storage unit to store and accumulate data, which is input from the transmission-side device, and controls write and read of the data so that the data is divided into a plurality of data and transmitted to the reception-side device.

In accordance with the above-described data transfer device, the data as a transfer target is divided into a plurality of pieces and transmitted to the reception-side device. Therefore, the data can be started to be transmitted from the storage unit to the reception-side device without waiting for the entire data as a transfer target to be written into the storage unit, and it becomes possible to enhance the speed of transferring the data.

SUMMARY

However, in the above-described data transfer device, when a part of such transfer target data is lost due to some kind of failure at the time of causing the storage unit to store the data, the control unit continues to wait for the arrival of the data since data with a predetermined data length is not stored. As a result, for example, such data transfer is interrupted, or it takes time to return to a normal data transfer operation. When there occurs a period while the data transfer is not normally performed as described above, data to be transferred during that period is not transferred, resulting in a possibility that important information may be missed.

Due to such circumstances, a technology is desired to be provided, which is capable of preventing the interruption of the data transfer even if a part of the transfer target data is lost when the data is divided into a plurality of data and transferred.

Outlines of representatives in inventions disclosed in the present application will be briefly described below.

A data transfer according to a device representative embodiment is a data transfer device that divides transfer target data and transfers divided pieces of the data in a burst manner from a transmission-side device to a reception-side device, including: a storage device and a control device, wherein the control device executes: storage processing for controlling the storage device to store one piece of input transfer target data; first transfer processing for controlling the storage device so that data transfer is performed at a set burst length as a data length of divided data when the one piece of transfer target data is divided by a first division number until a last part of the one piece of transfer target data is sensed; and second transfer processing for controlling the storage device, when the last part of the one piece of transfer target data is sensed, to adjust a burst length so that a data length of the one piece of transfer target data coincides with a total of data lengths of data to be transferred, and to transfer the data at the adjusted burst length.

According to the representative embodiment, the interruption of the data transfer can be prevented even if a part of the transfer target data is lost when the data is divided into a plurality of data and transferred.

BRIEF DESCRIPTION OF THE DRAWINGS

FIG. 8 is a second timing chart of the burst transfer.

DETAILED DESCRIPTION

Figure 1:
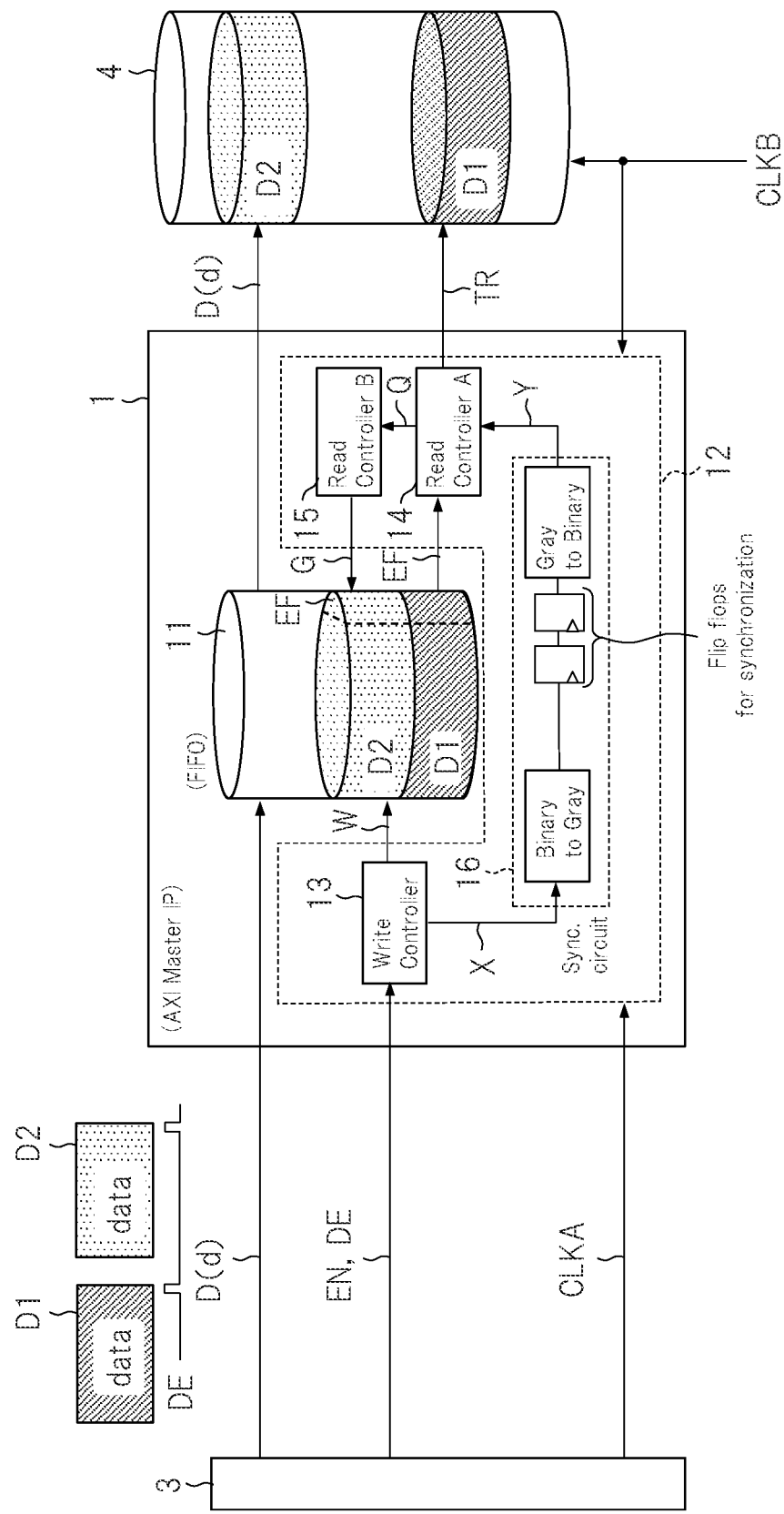
FIG. 1 is a diagram schematically showing a configuration of a data transfer device according to a first embodiment.

Next, embodiments will be described. Note that each of the embodiments is merely an example for achieving the present invention, and does not limit the technical scope of the present invention.

Moreover, in each of the following embodiments, the same reference numerals are assigned to components which have the same functions, and repeated descriptions thereof will be omitted unless otherwise required.

A data transfer device according to the embodiments of the present invention is a data transfer device that divides transfer target data and transfers divided pieces of the data in a burst manner from a transmission-side device to a reception-side device. The data transfer device includes a storage device and a control device. The control device executes storage processing, first transfer processing, and second transfer processing, which will be mentioned below.

The storage processing is processing for controlling the storage device to store one piece of input transfer target data.

The first transfer processing is processing for controlling the storage device so that data transfer is performed at a set burst length as a data length of divided data when the one piece of transfer target data is divided by a first division number until a part of the one piece of transfer target data is sensed to be lost.

The second transfer processing is processing for controlling the storage device, when a part of one piece of transfer target data is sensed to be lost, to adjust a burst length so that a data length of the one piece of transfer target data with a lost part coincides with a total of data lengths of data to be transferred, and to transfer the data at the adjusted burst length.

Moreover, for each piece of unit data which constitute the one piece of transfer target data, the data transfer device according to this embodiment receives the unit data and a data end signal that indicates whether or not the unit data is last unit data from the transmission-side device.

The above-described storage processing is processing for controlling the storage device to store, for each of a plurality of the unit data which constitute the one piece of transfer target data, the unit data and an end flag in association with each other, the end flag indicating whether or not the unit data is the last unit data.

The above-described first transfer processing is processing for controlling the storage device so that untransmitted unit data stored in the storage device and identified by referring to the end flags are transmitted to the reception-side device at the set burst length when the number of the untransmitted unit data is equal to or more than the set burst length.

The above-described second transfer processing is processing for controlling the storage device, when the number of the untransmitted unit data is less than the set burst length and the end flags are detected, so that the burst length is adjusted to transmit the number of the untransmitted unit data to the reception-side device, and so that the untransmitted unit data are transmitted to the reception-side device at the adjusted burst length.

Note that, as the data transfer device according to the embodiments of the present invention, for example, a device designed in conformity with the Advanced extensible Interface (AXI) bus protocol can be conceived.

First Embodiment

A data transfer device according to a first embodiment will be described.

Overview of Data Transfer Device According to First Embodiment

The data transfer device according to the first embodiment divides transfer target data and transfers the divided data in a burst manner from a transmission-side device to a reception-side device. By dividing the transfer target data, the data can be started to be transferred without waiting for all the transfer target data to be received, and a time taken to transfer the data can be shortened.

Each piece of the transfer target data is composed of a plurality of unit data. In this embodiment, the unit means data with a minimum size when transmitting/receiving the data, and for example, is data for one word.

The data transfer device according to the first embodiment writes the plurality of unit data, which are received from the transmission-side device, sequentially into a storage device of the data transfer device itself. The data transfer device has a function to sense a presence of unit data which are not written into the storage device of the data transfer device some reason during a burst transfer itself for operation, that is, to sense a loss of the unit data during the burst transfer operation. Upon sensing the loss of the unit data, the data transfer device adjusts a burst length, which is the number of the unit data to be transferred and is actually used, so that the transfer operation is prevented from being interrupted due to the fact that the burst length differs from the number of the unit data which are written into the storage device and are untransmitted to the reception-side device.

Configuration of Data Transfer Device According to First Embodiment

A configuration of the data transfer device according to the first embodiment will be described.

FIG. 1 is a diagram schematically showing FIG. a configuration of the data transfer device according to the first embodiment. As shown in FIG. 1, the data transfer device 1 according to the first embodiment includes a first in first out (FIFO) storage device 11 and a control device 12.

The FIFO storage device 11 is a storage device that outputs data, which is input thereto, in order of the input, that is, such a first in first out storage device. The FIFO storage device 11 receives control from the control device 12, and stores transfer target data D1, D2, . . . input thereto after being transmitted from a transmission-side device 3. The FIFO storage device 11 is achieved, for example, by a semiconductor integrated circuit, a programmable logic circuit and the like.

In order that the transfer target data D1, D2, . . . can be transferred in a burst manner from the transmission-side device 3 via the FIFO storage device 11 to the reception-side device 4, the control device 12 controls the FIFO storage device 11, and transmits a signal, which is related to the transfer, to the reception-side device 4.

Specifically, upon receiving a data enable signal EN, which issues a notice on transmission of unit data d, from the transmission-side device 3, the control device 12 controls the storage device 11 so that the unit data d input from the transmission-side device 3 are written into the FIFO storage device 11. Moreover, the control device 12 controls the storage device 11 so that unit data d for a determined burst length b are read from among unit data d which are stored in the storage device 11 and untransmitted to the reception-side device 4. Moreover, in order that the above-described unit data d thus read are received by the reception-side device 4, the control device 12 transmits, to the reception-side device 4, signals indicating a data length of data to be transmitted, timing of transmitting the data, and the like.

The control device 12 repeats such a control, thereby dividing the transfer target data D and transferring the divided data D to the reception-side device 4. Note that the control device 12 is achieved, for example, by a semiconductor integrated circuit, a programmable integrated circuit and the like.

The transmission-side device 3 sequentially transmits, to the data transfer device 1, the individual unit data d which constitute the transfer target data D. At the time of transmitting each piece of the unit data d, the transmission-side device 3 transmits the data enable signal EN to the data transfer device 1. Moreover, when that piece of unit data d is last unit data d among the unit data which constitute the transfer target data D, the transmission-side device 3 transmits, to the data transfer device 1, a data end signal DE indicating that the piece of unit data d is the last unit data d. By receiving this data end signal DE, the data transfer device 1 can sense a delimiter of the received data, and can distinguish the individual data from each other.

The transmission-side device 3 operates at a clock frequency CLKA. In this embodiment, the transmission-side device 3 has a clock generator (not shown), and operates on the basis of a clock signal output from this clock generator. The transmission-side device 3 transmits the clock signal of itself to the data transfer device 1. The data transfer device 1 receives this clock signal, and on the basis of the received clock signal, performs an operation of writing the unit data, which are input from the transmission-side device 3, to the FIFO storage device 11 in synchronization with the transmission of the unit data by the transmission-side device 3.

The transmission-side device 3 is, for example, an imaging device including an image sensor, and continuously transmits, as the transfer target data D, frame data which are image data based on an output of the image sensor.

The reception-side device 4 includes a storage device caused to store the data received from the data transfer device 1. The reception-side device 4 sequentially receives the transfer target data D from the data transfer device 1, and causes the storage device to store the received data.

The reception-side device 4 operates at a clock frequency CLKB. In this embodiment, the reception-side device 4 receives a clock signal from a clock generator (not shown) different from the clock generator of the transmission-side device 3, and operates on the basis of the received clock signal. The data transfer device 1 also receives the clock signal from this clock generator, and on the basis of the received clock signal, performs an operation of transmitting the unit data d, which are stored in the FIFO storage device 11, to the reception-side device 4.

The reception-side device 4 is, for example, a random access memory (RAM) having a semiconductor memory as a storage device.

Note that, as methods of generating, transmitting/receiving and synchronizing the clock signal, a variety of methods can be conceived, and such methods are not limited to the above-described embodiment. However, the data transfer device 1 is configured to be capable of identifying the clock frequency CLKA of the transmission-side device 3 and the clock frequency CLKB of the reception-side device 4.

Problems and Countermeasures at Division and Burst Transfer of Data

Normally, the unit data d transmitted from the transmission-side device 3 are sequentially written into the FIFO storage device 11. However, very rarely, for some reason, the unit data d transmitted from the transmission-side device 3 happen not to be received by the data transfer device 1, and not to be written into the FIFO storage device 11. That is, the unit data d transmitted from the transmission-side device 3 are lost in some cases.

When the unit data d are lost, the number u of untransmitted unit data d stored in the storage device 11 and the number of the unit data d intended to be read from the storage device 11 and to be transmitted do not coincide with each other. That is, when the unit data d are read at a set burst length b0 that is an initially set burst length b, there comes a situation where the number of the untransmitted unit data d is insufficient at around the end of the transfer target data D. When there comes such a situation, for example, the control device 12 waits for the input of the unit data d for a certain period of time, then resets the transfer operation, and restarts the transfer operation from the transfer target data D input thereafter. That is, the transfer target data D received from the transmission-side device 3 during the interruption of the transfer operation is not properly transferred to the reception-side device 4.

Accordingly, the control device 12 temporarily adjusts one piece of the transfer target data D so that a length thereof becomes smaller than the set burst length b0. Specifically, for example, the control device 12 adjusts the burst length b for actual use to be the same as the number u of the untransmitted unit data d. Moreover, for example, the control device 12 adjusts the burst length b for actual use to be a combination of burst lengths b smaller than the set burst length b0. This combination of the burst lengths b is obtained so that the total of the burst lengths b becomes the same as the number u of the untransmitted unit data.

Figure 2:
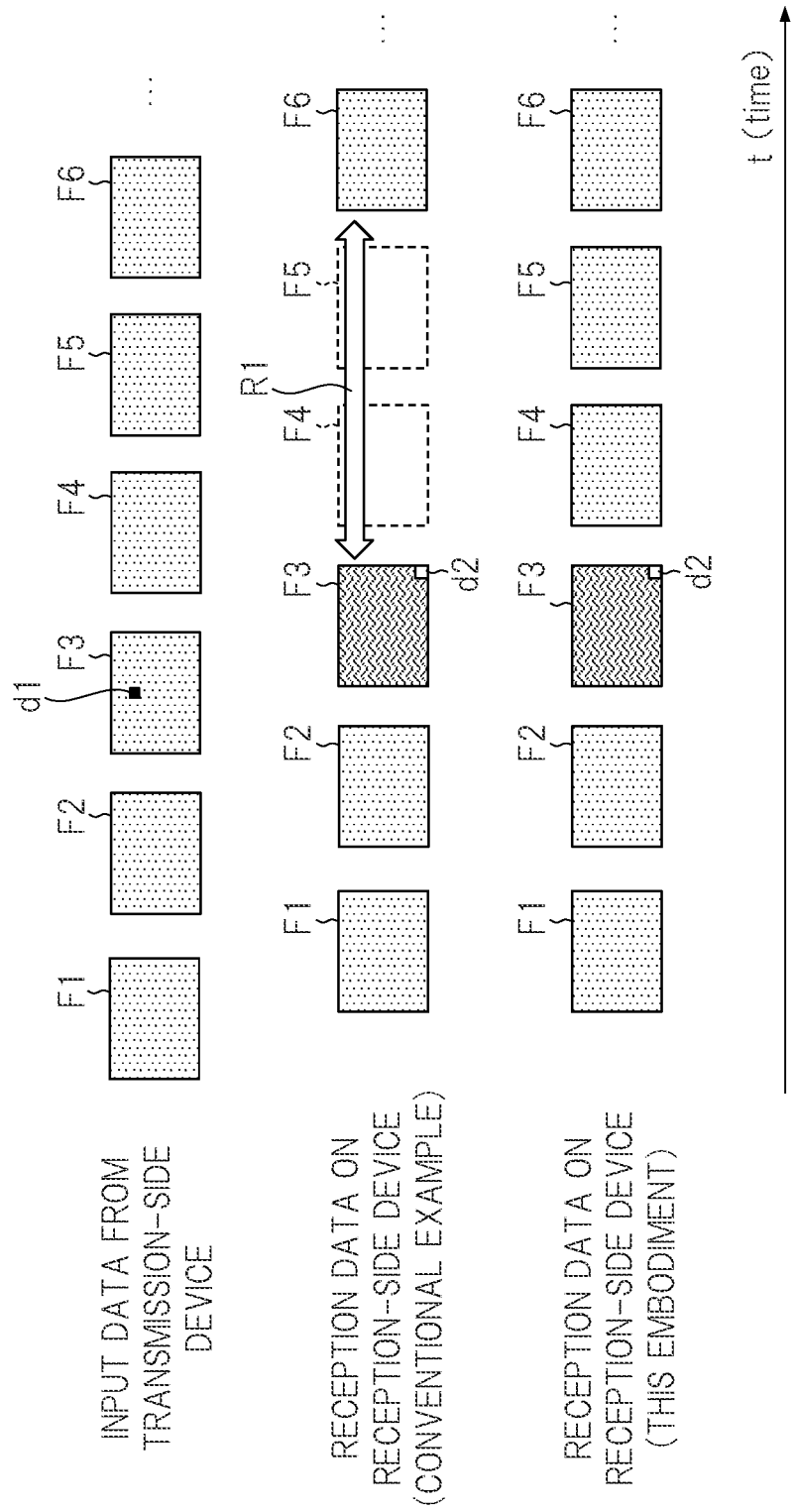
FIG. 2 is a diagram for explaining an influence given to data transfer when unit data are lost.

FIG. 2 is a diagram for explaining an influence given to the data transfer when the unit data are lost. In FIG. 2, a horizontal axis represents a time t. An upper part in FIG. 2 represents an example of data sequentially input from the transmission-side device 3 to the data transfer device 1. The example of FIG. 2 indicates a state where data F1, F2, . . . , F6, . . . are sequentially input to the data transfer device 1. Moreover, the example of FIG. 2 indicates that, among a plurality of unit data d which constitute the data F3, a piece of unit data d1 is lost without being input to the data transfer device 1.

A middle part in FIG. 2 represents an example of data sequentially output from the data transfer device 1 to the reception-side device 4. This example is an example of the case of the conventional data transfer device. This example indicates a state where, while the data F1 and F2 are output correctly, write of the last unit data d2 of the data F3 is not sensed due to the presence of the lost data d1, and the number of the unit data d intended to be transferred is insufficient. In this case, it becomes impossible to perform the transfer at the set burst length b0, and the transfer operation is temporarily interrupted. Due to an influence of this interruption, the data F4 and F5 transmitted form the transmission-side device 3 are not transferred during a period R1 taken to reset the transfer operation, and so on, and the transfer is resumed from the data F6 after recovery.

A lower part in FIG. 2 represents another example of the data sequentially output from the data transfer device 1 to the reception-side device 4. This example is an example of the case of the data transfer device 1 according to this embodiment. This example is the same as the conventional case in that the write of the last unit data d2 of the data F3 is not sensed due to the presence of the lost data d1 thereof, and that the number of the unit data d intended to be transferred is insufficient.

Meanwhile, when the number u of the untransmitted unit data d which are not transmitted to the reception-side device 4 yet is smaller than the set burst length b0, the data transfer device 1 according to this embodiment temporarily adjusts the burst length b for actual use to be smaller than the set burst length b0. By adjusting the burst length b as described above, the number of the unit data d intended to be transferred and the number u of the untransmitted unit data d are prevented from differing from each other, and the interruption of the transfer operation is avoided. When the interruption of the transfer operation is avoided, the data F4 and after are also transferred properly.

Configuration of Control Device

Returning to FIG. 1, a configuration of the control device 12 will be described. As shown in FIG. 1, the control device 12 includes a write controller 13, a read controller A 14, a read controller B 15, and a synchronization circuit 16.

The write controller 13 controls the FIFO storage device 11 by transmitting a control signal W to the FIFO storage device 11, thereby controlling write of data. Upon receiving the data enable signal EN from the transmission-side device 3, the write controller 13 receives the data end signal DE indicating whether or not the input unit data d is the last unit data d. Upon receiving the data end signal DE, the write controller 13 controls the FIFO storage device 11 so that the input unit data d and an end flag EF indicating whether or not this unit data d is the last unit data d are written into the FIFO storage device 11 in association with each other. Every time when the write of the unit data d is completed, the write controller 13 transmits a write position X to the synchronization circuit 16.

The read controller A 14 sets the burst length b at the time of dividing and transferring the transfer target data D as described above, that is, sets a data length of the data to be divided and transferred. A variety of methods of determining the set burst length b are conceivable. A predetermined burst length may be determined as the set burst length b0 that is a burst length to be set, or the burst length b calculated according to a predetermined algorithm may be determined as the set burst length b0.

When the set burst length b0 is determined according to a predetermined algorithm, for example, the method described in Patent Document 1 can be used. This method is a method of obtaining a division number n at the time of dividing and transferring the transfer target data D so that a transfer time becomes the shortest, and calculating the burst length b on the basis of the obtained division number n. The division number n in which the transfer time becomes the shortest can be obtained on the basis of the clock frequency CLKA of the transmission-side device 3, the clock frequency CLKB of the reception-side device 4, and the data length of the transfer target data D. Details of this method will be described later.

Moreover, by a synchronization signal Y output from the synchronization circuit 16, the read controller A 14 senses that the unit data d is written into the FIFO storage device 11. Every time of sensing that the unit data d is written, the read controller A 14 reads the end flag EF associated with the written unit data d. The read controller A 14 determines whether or not the end flag EF thus read represents that the unit data d is the last unit data d. In the case of determining that the end flag EF does not represent the unit data d is the last unit data d, the read controller A 14 continues to read such end flags EF until the number of the read end flags EF reaches the same number as the set burst length b0.

Moreover, every time of reading the end flag EF, the read controller A 14 determines whether or not the number of the read end flags EF, that is, the number u of the untransmitted unit data recognized not to be transmitted yet by the reception-side device 4 has reached the same number as the set burst length b0. In the case of determining that the number u of the untransmitted unit data has reached the same number as the set burst length b0, the read controller A 14 transmits a transmission instruction Q to the read controller B 15 to instruct the read controller B 15 to transmit the untransmitted unit data d at the set burst length b0. Moreover, together with the transmission of this transmission instruction Q, the read controller A 14 transmits, to the reception-side device 4, a transfer request TR that issues a notice on the transmission at the set burst length b0.

In the case of determining that the read end flag EF represents that the unit data d is the last unit data d, the read controller A 14 further determines whether or not the number u of the untransmitted unit data d is equal to the set burst length b0. In the case of determining that the number u of untransmitted unit data d is equal to the burst length b in this determination, the read controller A 14 transmits, to the read controller B 15, the transmission instruction Q to transmit the untransmitted unit data d at the set burst length b0. Moreover, together with the transmission of this transmission instruction Q, the read controller A 14 transmits, to the reception-side device 4, the transfer request TR that issues a notice on the transmission at the set burst length b0.

Meanwhile, in the case of determining that the number u of the untransmitted unit data d is not equal to the set burst length b in the case of determining that the read end flag EF represents that the unit data d is the last unit data d, the read controller A 14 adjusts the burst length b for actual use.

That is, the read controller A 14 adjusts the burst length b to a combination of a plurality of burst lengths b1, b2, . . . which are smaller than the set burst length b0, so that the total of the burst lengths b becomes equal to the number u of the untransmitted unit data d. Specifically, the read controller A 14 selects and combines the numbers (amounts of data) of unit data d from among the numbers of transferable unit data d, which are close to the set burst length b0. For example, when the set burst length b0 is 4, and the number u of the untransmitted unit data d is 3, the read controller A 14 adjusts the burst length b for actual use to a combination of b1=2 and b2=1.

Then, the read controller A 14 transmits a transmission instruction Q for b1 pieces of the untransmitted unit data d to the read controller B 15, and transmits a transfer request TR for the b1 pieces of the untransmitted unit data d to the reception-side device 4. Thereafter, the read controller A 14 transmits a transmission instruction Q for b2 pieces of the untransmitted unit data d to the read controller B 15, and transmits a transfer request TR for the b2 pieces of the untransmitted unit data d to the reception-side device 4.

The read controller B 15 controls the FIFO storage device 11 by transmitting a control signal G to the FIFO storage device 11, thereby controlling the read of the unit data from the FIFO storage device 11 and the transmission thereof. Upon receiving the transmission instruction Q from the read controller A 14, the read controller B 15 controls the FIFO storage device 11 so that the untransmitted unit data d for the burst length b determined by the transmission instruction Q are read and transmitted to the reception-side device 4.

The synchronization circuit 16 is a circuit for resolving a metastable state in asynchronous processing under a situation where the clock frequency CLKA of the transmission-side device 3 and the clock frequency CLKB of the reception-side device 4 differ from each other. Upon receiving the write position X indicating that the unit data d is written from the write controller 13, the synchronization circuit 16 transmits the synchronization signal Y thereof to the read controller A 14. This synchronization signal Y plays a role of notifying the read controller A 14 that the input unit data d is written into the FIFO storage device 11. For example, the synchronization circuit 16 is composed of a circuit in which a circuit that converts binary data to gray data, a plurality of flip-flop circuits, and a circuit that converts gray data to binary data are connected with one another.

Processing Flow in Data Transfer Device According to First Embodiment

A processing flow in the data transfer device 1 according to the first embodiment will be described.

Upon receiving the data enable signal EN from the transmission-side device 3, the write controller 13 controls the FIFO storage device 11 so that such unit data d thus input and the end flags EF thereof are stored in the FIFO storage device 11 in association with each other. That is, independently of the other controllers, the write controller 13 performs control so that the input unit data d are sequentially written into the FIFO storage device 11.

Upon receiving the transmission instruction Q from the read controller A 14, the read controller B 15 controls the FIFO storage device 11 so that the untransmitted unit data d are transmitted to the reception-side device 4 at the burst length b determined by the transmission instruction Q.

Hence, the processing in the data transfer device 1 according to the first embodiment is determined by the processing in the read controller A 14. Accordingly, a processing flow in the read controller A 14 will be described herein.

Figure 3:
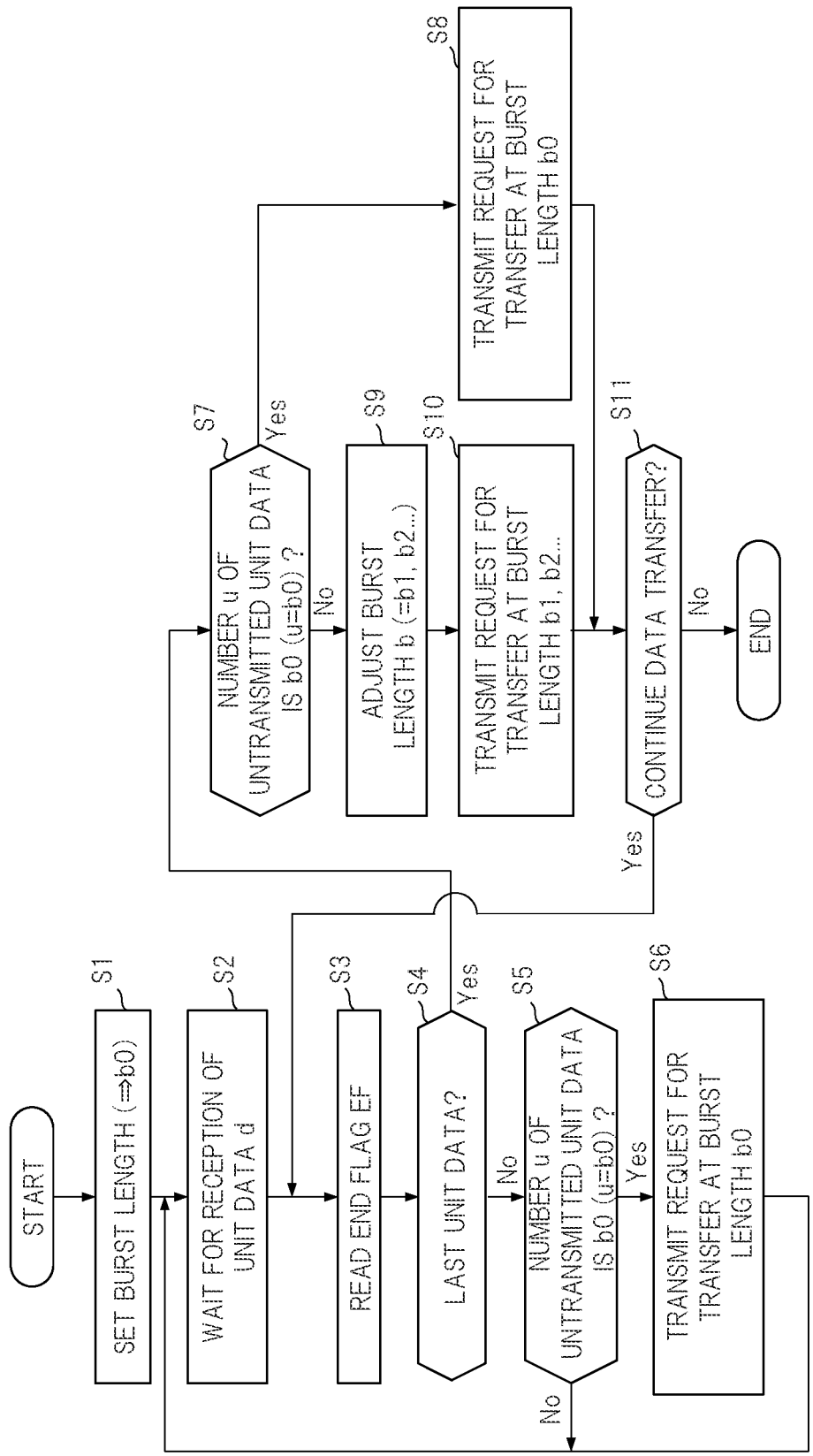
FIG. 3 is a flowchart showing processing of a read controller A according to the first embodiment.

FIG. 3 is a flowchart showing the processing of the read controller A according to the first embodiment. Note that FIG. 3 is merely an example, and the processing of the read controller A is not limited to this.

In Step S1, performed is processing for setting the burst length b at the time of dividing and transferring the transfer target data D and determining the set burst length b0. Specifically, the read controller A 14 obtains the division number n in which the transfer time becomes the shortest on the basis of the clock frequency CLKA of the transmission-side device 3, the clock frequency CLKB of the reception-side device 4, and the data length N of the transfer target data D. The read controller A 14 obtains an optimal length b by dividing the data length N of the transfer target data D by the obtained division number n, and determines the obtained burst length b as the set burst length b0 for standard use.

In Step S2, reception waiting processing for the unit data d is performed. Upon receiving the unit data from the transmission-side device 3, the write controller 13 controls the FIFO storage device 11 so that the unit data d thus input and the end flags EF at that time are written into the FIFO storage device 11. Every time when the unit data d is received and written into the FIFO storage device 11, the write controller 13 transmits the write position X to the synchronization circuit 16. Upon receiving the write position X, the synchronization circuit 16 transmits the synchronization signal Y, which is synchronized therewith, to the read controller A 14. The read controller A 14 receives that synchronization signal Y, thereby sensing that the unit data d is written. That is, on the basis of a difference between a read position of the read controller A itself and a received write position, the read controller A recognizes that the unit data d is written. The read controller A 14 keeps on standby until receiving the synchronization signal Y. Upon receiving the synchronization signal Y, the read controller A 14 proceeds to the next Step S3.

In Step S3, performed is processing for reading the end flag EF. Specifically, from the FIFO storage device 11, the read controller A 14 reads the end flag EF of the oldest unit data d among the unit data d untransmitted to the reception-side device 4. At this time, the number u of the untransmitted unit data d is incremented (u←u+1; initial value of u=0).

In Step S4, performed is a determination as to whether or not the read end flag EF represents that the unit data d is the last unit data d. Specifically, the read controller A 14 determines whether or not the end flag EF read in Step S3 represents that the unit data d corresponding thereto is the last unit data d. When it is determined in this determination that the end flag EF represents that the unit data d is the last unit data d (S4: Yes), the processing proceeds to Step S7. Meanwhile, when it is determined in this determination that the end flag EF does not represent that the unit data d is the last unit data d (S4: No), the processing proceeds to Step S5.

In Step S5, performed is processing for determining whether or not the number u of the untransmitted unit data d is equal to the set burst length b0. Specifically, the read controller A 14 determines whether or not the number of such end flags EF read from the FIFO storage device 11 in Step S3, that is, the number u of the untransmitted unit data d is equal to the set burst length b0. When it is determined in this determination that the number u of the untransmitted unit data d is equal to the set burst length b0 (S5: Yes), the processing proceeds to Step S6, and when it is determined therein that the number u of the untransmitted unit data d is not equal to the set burst length b0 (S5: No), the processing proceeds to Step S2.

In Step S6, performed is processing for transmitting the transfer request TR and the transmission instruction Q for the unit data d at the set burst length b0. Specifically, the read controller A 14 transmits the transfer request TR to the reception-side device 4, and transmits, to the read controller B 15, the transmission instruction Q for instructing the transmission of the unit data d at the set burst length b0. Upon receiving the transfer request TR, the reception-side device 4 prepares to receive the transmitted unit data d for the set burst length b0. Upon receiving the transmission instruction Q, the read controller B 15 controls the FIFO storage device 11 so that the untransmitted unit data d for the set burst length b0, that is, the unit data d whose number is u are transmitted to the reception-side device 4. By this control, the unit data d whose number is u, that is, for the set burst length b0 are transmitted to the reception-side device 4. When the transmission of the unit data d for the set burst length b0 is completed, the processing returns to Step S2, and the standby for the reception of the unit data d is performed again. At this time, the number u of the untransmitted unit data d is reset to 0.

In Step S7, performed is processing for determining whether or not the number u of the untransmitted unit data d is equal to the set burst length b0. Specifically, the read controller A 14 determines whether or not the number of the end flags EF read from the FIFO storage device 11 in Step S3, that is, the number u of the untransmitted unit data d is equal to the set burst length b0. When it is determined in this determination that the number u of the unit data is equal to the set burst length b0 (S7: Yes), the processing proceeds to Step S8. Meanwhile, when it is determined in this determination that the number u of the untransmitted unit data d is not equal to the set burst length b0 (S7: No), the processing proceeds to Step S9.

In Step S8, performed is processing for transmitting the transfer request TR and transmission instruction Q for the unit data d at the set burst length b0. Specifically, the read controller A 14 transmits the transfer request TR to the reception-side device 4, and transmits, to the read controller B 15, the transmission instruction Q for instructing the transmission of the unit data d at the set burst length b0. Upon receiving the transfer request TR, the reception-side device 4 prepares to receive the transmitted unit data d for the set burst length b0. Upon receiving the transmission instruction Q, the read controller B 15 controls the FIFO storage device 11 so that the untransmitted unit data d for the set burst length b0, that is, the untransmitted unit data d whose number is u are transmitted to the reception-side device 4. By this control, the unit data d whose number is u, that is, for the set burst length b0 are transmitted to the reception-side device 4. When the transmission of the unit data d for the set burst length b0 is completed, the transfer processing for one piece of the transfer target data D is finished. Thereafter, the processing proceeds to Step S11.

In Step S9, processing for adjusting the burst length b is performed. Specifically, the read controller A 14 adjusts the burst length b to a combination of a plurality of burst lengths b1, b2, . . . and bn, which are smaller than the set burst length b0, so that the total of the burst lengths b becomes equal to the number u of the untransmitted unit data d. That is, b1+b2+ . . . +bn is determined so as to be u=b1+b2+ . . . +bn.

In this embodiment, at the time of adjusting the burst length b, one or a plurality of values are selected from among values smaller than the set burst length b0 so that larger values are given higher priorities, and the selected values are defined as the adjusted burst lengths b1, b2, . . . For example, as candidates for the burst lengths, a plurality of the numbers of the unit data d, which can be transferred at once by the data transfer device 1, are prepared. Then, from among these candidates for the burst lengths, candidates for the burst lengths, which are close to the set burst length b0, are preferentially selected, and are combined so that a total thereof becomes the number u. Note that the set burst length b0 and the candidates for the burst lengths, which are for the adjustment, can be set to values (1, 2, 4, . . . ) represented by powers of 2 for example.

A specific adjustment example of the burst length b will be described. For example, when the set burst length b0 is 8, then 4, 2 and 1 are prepared as the candidates for the burst lengths. When the number u of the untransmitted unit data d is 7, the burst length b is adjusted to a combination of b1=4, b2=2, and b3=1. Moreover, for example, when the set burst length b0 is 4, then 2 and 1 are prepared as the candidates for the burst lengths. When the number u of the untransmitted unit data d is 3, the burst length b is adjusted to a combination of b1=2, and b2=1.

When the burst length b is adjusted as described above in Step S9, the processing proceeds to Step S10, where data transfer at the adjusted burst lengths b1, b2, . . . is performed.

In Step S10, processing for transmitting the transfer request TR and the transmission instruction Q is performed for each of the adjusted combinations of the burst lengths b1, b2, . . . and bn. Specifically, the read controller A 14 sequentially transmits the transfer requests TR and the transmission instructions Q for the number of the above-described combinations to the reception-side device 4 and the read controller B 15.

That is, the read controller A 14 transmits such a transfer request TR for the b1 pieces of the untransmitted unit data d to the reception-side device 4, and transmits such a transmission instruction Q for instructing transmission of the b1 pieces of the untransmitted unit data d to the read controller B 15. Moreover, when the burst length b2 is present, the read controller A 14 transmits such a transfer request TR for the b2 pieces of the untransmitted unit data d to the reception-side device 4, and transmits such a transmission instruction Q for instructing transmission of the b2 pieces of the untransmitted unit data d to the read controller B 15. In this manner, the read controller A 14 transmits the transfer requests TR and the transmission instructions Q for all the burst lengths, which reach the last burst length bn, in the above-described combinations.

Upon receiving the transfer request TR, the read controller B 15 controls the FIFO storage device 11 so that the untransmitted unit data d for the adjusted burst length at that time are transmitted to the reception-side device 4. This control is performed every time when the transmission instruction Q is received. By these controls, the unit data d whose number s u are transmitted to the reception-side device 4. Then, the transfer of the one piece of the transfer target data D is completed by the transmission of the unit data d, which is performed herein. However, the data D transferred at this time is data in which a part of the unit data d is lost.

As described above, by the processing (S9) for adjusting the burst length b and by the processing (S10) for transmitting the transfer requests TR and the transmission instructions Q at the adjusted burst length b, the number u of the untransmitted unit data d and the number of the unit data d intended to be transmitted do not differ from each other. That is, even if the unit data d is lost, the reception standby for the unit data d by the read controller A 14 can be prevented from being performed for a long time, and the transfer operation is avoided being interrupted.

After the processing in Step S10, which is for transmitting the transfer requests TR and the transmission instructions Q, is performed, the processing proceeds to Step S11. At this time, the number of the unit data d u recognized to be untransmitted is reset to 0, and the burst length b is reset to the initial set burst length b0.

In Step S11, processing for determining whether or not to continue the data transfer is performed. Specifically, the read controller A 14 determines whether or not to continue the data transfer. For example, when an event due to which the data transfer should be interrupted occurs, or when there are no more data to be transferred, it is determined not to continue the data transfer. Otherwise, it is determined to continue the data transfer. When it is determined in this determination to continue the data transfer (S11: Yes), the processing returns to Step S3, and when it is determined therein to continue the data transfer (S11: No), the data transfer processing is finished.

Specific Example of Processing in Data Transfer Device According to First Embodiment Herein, by using a specific example, a description will be given of processing at each piece of timing based on a clock signal in the data transfer device 1 according to the first embodiment.

Figure 4:
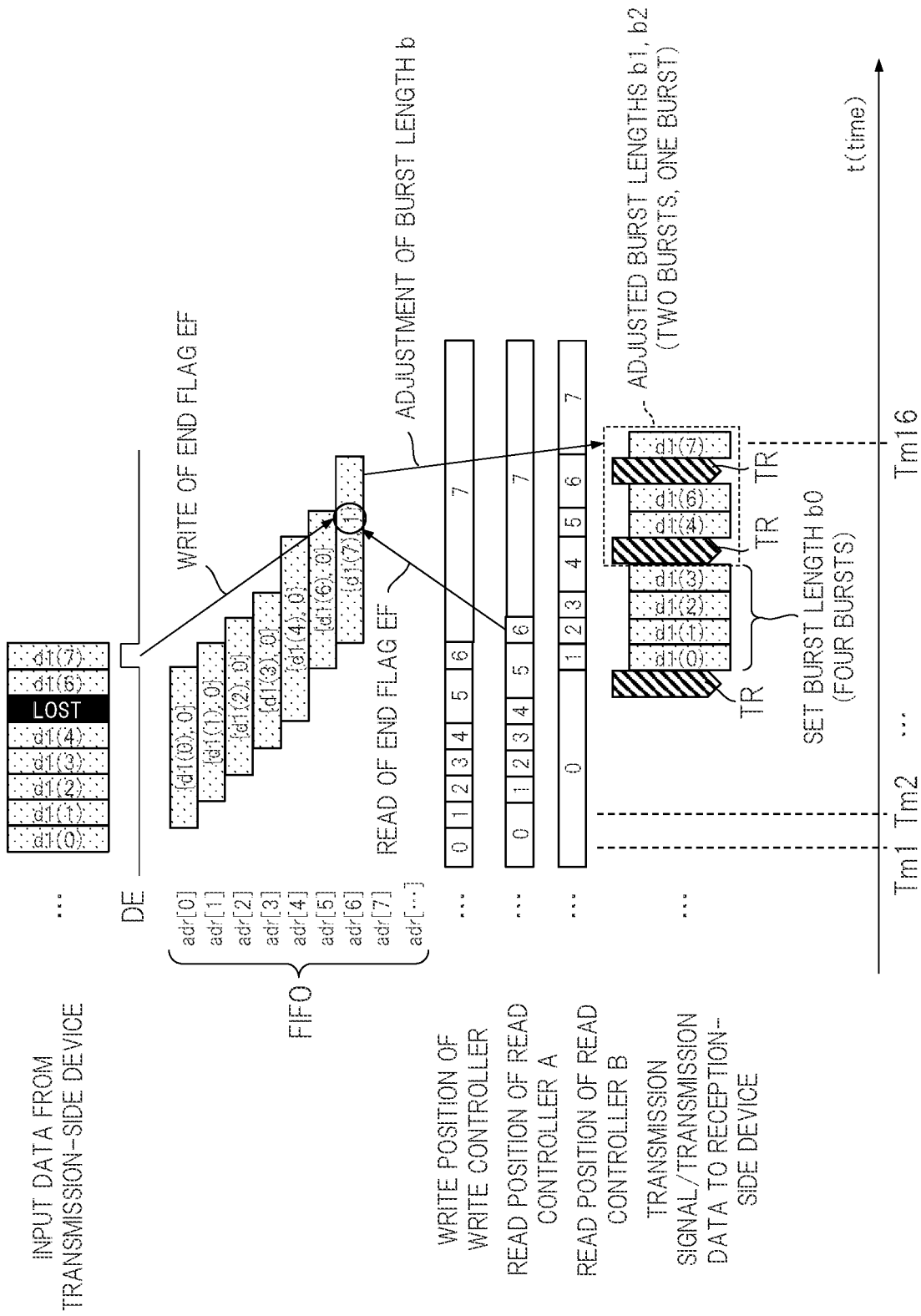
FIG. 4 is a diagram for specifically explaining processing of the data transfer device according to the first embodiment.

FIG. 4 is a diagram for specifically explaining the processing of the data transfer device according to the first embodiment. FIG. 4 schematically shows a specific example of the processing at each piece of the timing based on the clock signal in the data transfer device 1. Note that, in this embodiment, for convenience, it is assumed that the clock frequency CLKA of the transmission-side device 3 and the clock frequency CLKB of the reception-side device 4 are the same. It is assumed that the one piece of the transfer target data D is composed of eight pieces of the unit data d. Moreover, it is assumed that the set burst length b0 is 4, that is, that the transfer is performed by four bursts.

In FIG. 4, a horizontal axis represents a time t. An upper part of FIG. 4 shows eight unit data d1(0), d1(1), . . . , d1(7) which constitute the unit data D1 input to the data transfer device 1. These unit data d are arrayed from the left in an input order. A waveform shown below the eight unit data shows a time change of an output level of the data end signal DE. In this embodiment, regarding the data end signal DE, a "high (H)" level is output in synchronization with an input of the last unit data d1(7). Moreover, in this embodiment, a case is assumed where the sixth unit data d1(5) of the data D1 is lost.

An upper part at around the center of FIG. 4 shows addresses adr[0], adr[1], . . . , adr[7], . . . of the FIFO storage device 11. A right side of each address shows a combination of the unit data d written into the address and the end flag EF corresponding to the unit data d. Each end flag EF is a flag that shows an output level of the data end signal DE, and is given 1 when the output level is "H", and is given 0 when the output level is "low (L)". For example, into the address adr[0], data {d1(0), 0} is written, in which the unit data d1(0) and the end flag EF given the value 0 are associated with each other. Moreover, into the address adr[6], data {d1(7), 1} is written, in which the unit data d1(7) and the end flag EF given the value 1 are associated with each other.

A lower part at around the center of FIG. 4 shows a "write position of the write controller", a "read position of the read controller A", and a "read position of the read controller B". The "write position of the write controller" represents a time change of address numbers into which the input unit data d are written. The "read position of the read controller A" represents a time change of address numbers serving as read destinations when the read controller A 14 reads the end flags EF from the FIFO storage device 11. The "read position of the read controller B" represents a time change of address numbers serving as read destinations when the read controller B 15 reads the unit data d from the FIFO storage device 11 and transmits the same.

A lower part of FIG. 4 shows "transmission signal/ transmission data to the reception-side device". The "transmission signal/transmission data to the reception-side device" show the transfer request TR (the transmission instruction Q) and the unit data d, which are transmitted at each piece of timing.

As shown in FIG. 4, at first timing Tm1 as a start, the write position of the write controller 13, the read position of the read controller A 14, and the read position of the read controller B 15 are each 0. At this time, the input unit data d1(0) and "L" of the data end signal DE are received in the data transfer device 1 (S2). Write of the unit data d1(0) and the end flag EF is performed at the next timing. The unit data d and the end flag EF, which are read from the FIFO storage device 11, are not present yet, and accordingly, the standby for the data reception continues.

At second timing Tm2, the input unit data d1(1) and "L" of the data end signal DE are received. The write controller 13 performs control so that the data {d1(0), 0} is written into the address adr[0] on the basis of the unit data d1(0) and "L" of the data end signal DE, which are received at the previous timing Tm1 (S2). The data {d1(0), 0} is data in which the unit data d1(0) is accompanied by the end flag EF thereof. The end flag EF becomes 0 when the data end signal DE is "L", and becomes 1 when the data end signal DE is "H". The write position of the write controller 13, that is, the address number is incremented to be 1. Since no data is written at the previous timing Tm1, the read controller A 14 does not read the end flag EF, or so on.

At third timing Tm3, the input unit data d1(2) and "L" of the data end signal DE are received. The write controller 13 performs control so that the data {d1(1), 0} is written into the address adr[1] on the basis of the unit data d1(1) and "L" of the data end signal DE, which are received at the previous timing Tm2 (S2). The write position of the write controller 13 is incremented to be 2. The read controller A 14 reads the end flag EF of the address adr[0] (S3). The read controller A 14 confirms that the end flag EF is 0 (S4: No). Then, the read controller A 14 confirms that the confirmed number u of the untransmitted unit data d is 1, and has not reached 4 that is the set burst length b0 (S5: No). The read position of the read controller A 14 is incremented to be 1.

At fourth timing Tm4, the input unit data d1(3) and "L" of the data end signal DE are received. The write controller 13 performs control so that the data {d1(2), 0} is written into the address adr[2] on the basis of the unit data d1(3) and "L" of the data end signal DE, which are received at the previous timing Tm3 (S2). The write position of the write controller 13 is incremented to be 3. The read controller A 14 reads the end flag EF of the address adr[1] (S3). The read controller A 14 confirms that the end flag EF is 0 (S4: No). Then, the read controller A 14 confirms that the confirmed number u of the untransmitted unit data d is 2, and has not reached 4 that is the set burst length b0 (S5: No). The read position of the read controller A 14 is incremented to be 2.

At fifth timing Tm5, the input unit data d1(4) and "L" of the data end signal DE are received. The write controller 13 performs control so that the data {d1(3), 0} is written into the address adr[3] on the basis of the unit data d1(3) and "L" of the data end signal DE, which are received at the previous timing Tm4 (S2). The write position of the write controller 13 is incremented to be 4. The read controller A 14 reads the end flag EF of the address adr[2] (S3). The read controller A 14 confirms that the end flag EF is 0 (S4: No). Then, the read controller A 14 confirms that the confirmed number u of the untransmitted unit data d is 3, and has not reached 4 that is the set burst length b0 (S5: No). The read position of the read controller A 14 is incremented to be 3.

At sixth timing Tm6, the unit data d1(5) is not input or received, and accordingly, is lost. The write controller 13 performs control so that the data {d1(4), 0} is written into the address adr[4] on the basis of the unit data d1(4) and "L" of the data end signal DE, which are received at the previous timing Tm5 (S2). The write position of the write controller 13 is incremented to be 5. The read controller A 14 reads the end flag EF of the address adr[3] (S3). The read controller A 14 confirms that the end flag EF is 0 (S4: No). Then, the read controller A 14 confirms that the confirmed number u of the untransmitted unit data d is 4, and has reached 4 that is the set burst length b0 (S5: Yes). The read controller A 14 determines to transmit the transfer request TR to the reception-side device 4 and to transmit the transmission instruction Q to the read controller B 15 at the next timing Tm7 (S6). The read position of the read controller A 14 is incremented to be 4. The confirmed number u of the untransmitted unit data d is reset to 0.

At seventh timing Tm7, the input unit data d1(6) and "L" of the data end signal DE are received. The write controller 13 does not write anything to the address adr[5] since no data is received at the previous timing Tm6. The write position of the write controller 13 is not incremented, but remains to be 5. The read controller A 14 reads the end flag EF of the address adr[4] (S3). The read controller A 14 confirms that the end flag EF is 0 (S4: No). Then, the read controller A 14 confirms that the confirmed number u of the untransmitted unit data d is 1, and has not reached 4 that is the set burst length b0 (S5: No). As determined at the previous timing Tm6, the read controller A 14 transmits the transmission instruction Q to the read controller B 15. The read position of the read controller A 14 is incremented to be 5.

At eighth timing Tm8, the input unit data d1(7) and "H" of the data end signal DE are received. The write controller 13 performs control so that the data {d1(6), 0} is written into the address adr[5] on the basis of the unit data d1(6) and "L" of the data end signal DE, which are received at the previous timing Tm7 (S2). The write position of the write controller 13 is incremented to be 6. Since the end flag EF is not written into the address adr[5], the read controller A 14 does not read the end flag EF. Since the read controller B15 has received the transmission instruction Q at the previous timing Tm7, the read controller B 15 performs control so that the unit data d1(0) of the address adr[0] is read and transmitted to the reception-side device 4. The read position of the read controller B 15 is incremented to be 1.

At ninth timing Tm9, no data is input or received. The write controller 13 performs control so that the data {d1(7), 1} is written into the address adr[6] on the basis of the unit data d1(7) and "H" of the data end signal DE, which are received at the previous timing Tm8 (S2). The write position of the write controller 13 is incremented to be 7. The read controller A 14 reads the end flag EF of the address adr[5] (S3). The read controller A 14 confirms that the end flag EF is 0 (S4: No). Then, the read controller A 14 confirms that the confirmed number u of the untransmitted unit data d is 2, and has not reached 4 that is the set burst length b0 (S5: No). The read position of the read controller A 14 is incremented to be 6. The read controller B 15 performs control so that the unit data d1(1) of the address adr[1] is read and transmitted to the reception-side device 4. The read position of the read controller B 15 is incremented to be 2.

At tenth timing Tm10, no data is input or received. The write controller 13 does not write anything to the address adr[7] since no data is received at the previous timing Tm9. The write position of the write controller 13 is not incremented, but remains to be 7. The read controller A 14 reads the end flag EF of the address adr[6] (S3). The read controller A 14 confirms that the end flag EF is 1 (S4: Yes). Then, the read controller A 14 confirms that the confirmed number u of the untransmitted unit data d is 3, and has not reached 4 that is the set burst length b0 (S7: No). The read position of the read controller A 14 is incremented to be 7. The read controller B 15 performs control so that the unit data d1(2) of the address adr[2] is read and transmitted to the reception-side device 4. The read position of the read controller B 15 is incremented to be 3.

At eleventh timing Tm11, since the number u of the untransmitted unit data d has not reached 4 that is the set burst length b0 though the end flag EF is 1, the read controller A 14 adjusts the burst length b (S9). Herein, since the number u of the untransmitted unit data d is 3, the burst length b is determined to be a combination of the burst length b1=2 and the burst length b2=1 so that the total thereof becomes 3. That is, after transmitting the transfer request TR and the transmission instruction Q at the burst length b1=2, the read controller A 14 transmits the transfer request TR and the transmission instruction Q at the burst length b2=1 after the transfer is finished. The read controller A 14 determines to transmit the transfer request TR to the read controller B 15 at the burst length b1=2 at the next timing Tm12 (S10). The read position of the read controller A 14 remains to be 7. The read controller B 15 performs control so that the unit data d1(3) of the address adr[2] is transmitted to the reception-side device 4. The read position of the read controller B 15 is incremented to be 4.

At twelfth timing Tm12, no data is input or received. The write controller 13 does not write anything to the address adr[7] since no data is received at the previous timing Tm11. The write position of the write controller 13 is not incremented, but remains to be 7. Since the end flag EF is not written into the address adr[7], the read controller A 14 does not read the end flag EF. Hence, the read controller A 14 does not confirm the value of the end flag EF. As determined at the previous timing Tm11, the read controller A 14 transmits the transfer request TR and the transmission instruction Q to the read controller B 15 at the burst length b1=2. The read position of the read controller A 14 remains to be 7. The read position of the read controller B 15 remains to be 4.

At thirteenth timing Tm13, no data is input or received. The write controller 13 does not write anything to the address adr[7] since no data is received at the previous timing Tm12. The write position of the write controller 13 remains to be 7. Since the end flag EF is not written into the address adr[7], the read controller A 14 does not read the end flag EF. Since the read controller B15 has received the transmission instruction Q at the burst length b1=2 at the previous timing Tm12, the read controller B 15 performs control so that the unit data d1(4) of the address adr[4] is transmitted to the reception-side device 4. The read position of the read controller B 15 is incremented to be 5.

At fourteenth timing Tm14, the read controller B 15 performs control so that the unit data d1(6) of the address adr[5] is read and transmitted to the reception-side device 4. This completes the transfer at the burst length b1=2. The read position of the read controller B 15 is incremented to be 6.

At fifteenth timing Tm15, as determined at the eleventh timing Tm11, the read controller A 14 transmits the transmission instruction Q to the read controller B 15 at the burst length b2=1. The read position of the read controller A 14 remains to be 7. The read position of the read controller B 15 remains to be 6.

Since the read controller B15 has received the transmission instruction Q at the burst length b2=1 at the previous timing Tm15, at sixteenth timing Tm16, the read controller B 15 performs control so that the unit data d1(7) of the address adr[6] is read and transmitted to the reception-side device 4. The read position of the read controller B 15 is incremented to be 7.

Calculation Method of Set Burst Length

Herein, a calculation method of the burst length set in Step S1 will be described. This calculation method of the burst length is a calculation method based on an operating speed of the transmission-side device 3, an operating speed of the reception-side device 4, and the data length of the transfer target data D. This calculation method of the burst length first obtains the division number n of the data so that the time taken to transfer the transfer target data D becomes shorter than in the case of transferring the transfer target data D without dividing the same, and obtains, as the burst length b0 to be set, a data length of divided data obtained when the transfer target data D is divided by the division number n. Note that this calculation method of the burst length differs depending on whether clock speeds of the transmission-side device 3 and the reception-side device 4 are fast or slow.

Figure 5:
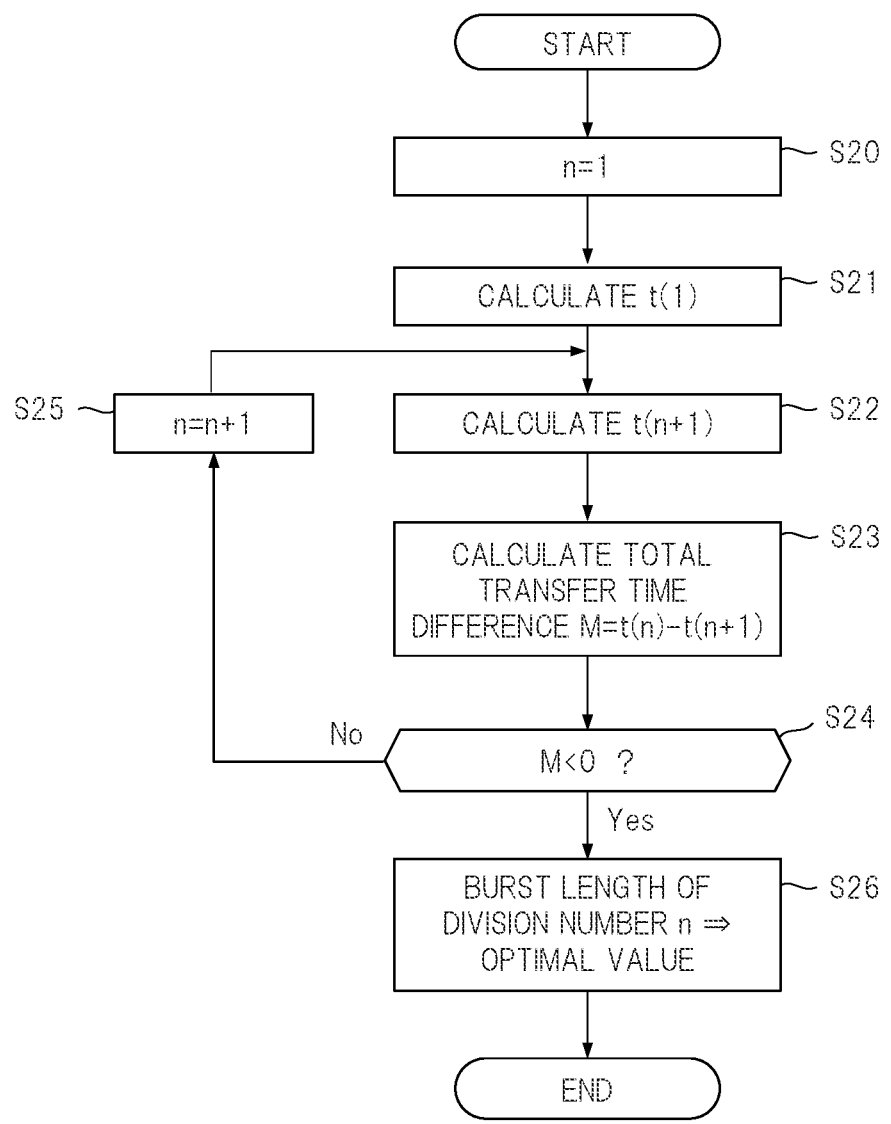
FIG. 5 is a flowchart showing a first calculation method of a burst length.

FIG. 5 is a flowchart showing a first calculation method of the burst length. The first calculation method is a calculation method of the burst length when the transmission-side device operates at a faster clock frequency than the reception-side device. Herein, n indicates the division number, and t(n) indicates a total transfer time when the burst length is divided by n.

In Step S20, n is set to 1.

In Step S21, the total transfer time t(1) is calculated by taking, as a reference, a burst length with the same number as the maximum number of data N storable in the FIFO storage device 11.

In Step S22, a total transfer time t(n+1) when the division number n is increased is calculated.

In Step S23, a difference $M=t(n)-t(n+1)$ is obtained, and if $M\geq 0$ (Step S24a: No), n is increased by 1 in Step S25, and the processing returns to step S22. Meanwhile, if $M<0$, the processing proceeds to Step S26.

In Step S26, n is set to a division number desired to be obtained, a burst length of the division number n is set to the optimal burst length, and a series of the processing is finished. Herein, when the divided burst length is b, the divided burst length b is represented by b=N/n where N (N is an integer of 2 or more) is the maximum burst length and n is the division number at that time.

Figure 6:
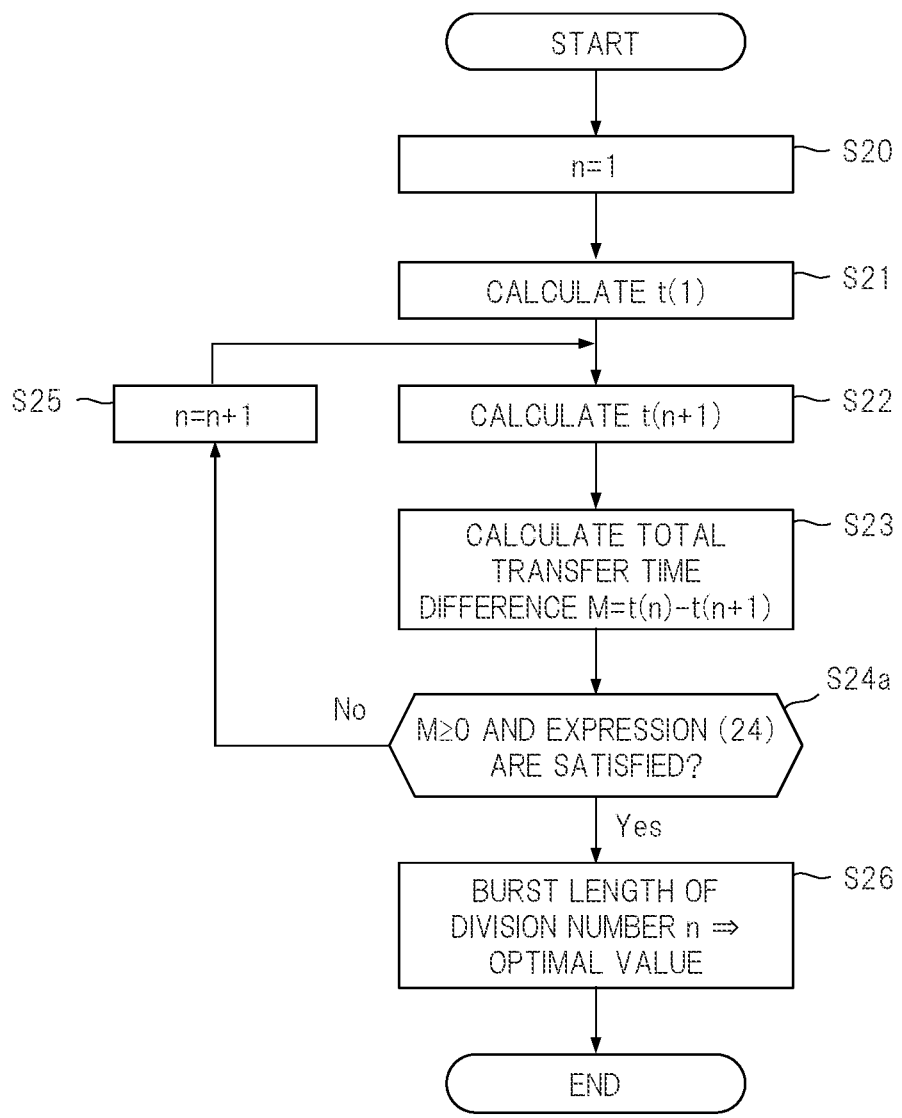
FIG. 6 is a flowchart showing a second calculation method of the burst length.

FIG. 6 is a flowchart showing a second calculation method of the burst length. The second calculation method is a calculation method of the burst length when the reception-side device operates at a faster clock frequency than the transmission-side device. A difference of FIG. 6 from FIG. 5 is that, in addition to the calculation of the difference M, a restriction shown in Expression (24) to be described later is added to the burst length b in Step S24a.

Figure 7:
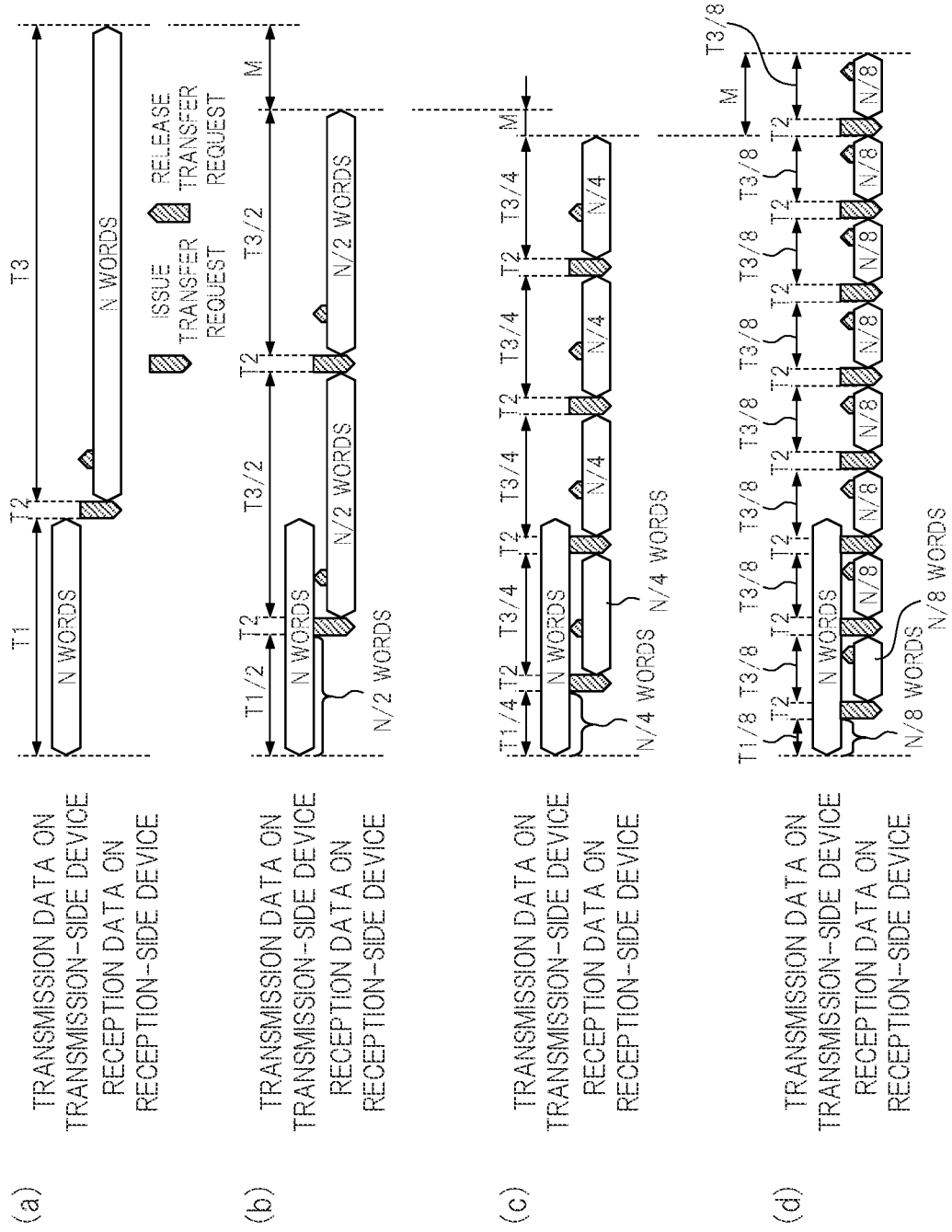
FIG. 7 is a first timing chart of burst transfer.

Next, a timing chart at the time of the burst transfer will be described. FIG. 7 is a first timing chart of the burst transfer. The first timing chart is a timing chart when the transmission-side device 3 operates at a faster clock frequency than the reception-side device 4.

FIG. 7 shows an example of an operation for each of the burst lengths when the division number is increased like 1, 2, 4 and 8 as shown in FIGS. 7A, 7B, 7C and 7D in the event of performing burst transfer for N words from the transmission-side device 3 to the reception-side device 4. When transmission data is divided and received at a short burst length a plurality of times, data transfer thereof can be started at the point of time when unit data for one burst length aggregate. Accordingly, as a tendency, the reception of the data is started earlier for that amount, and the overall time taken for the transfer is shortened.

However, as the burst length is shortened to increase the number of transfer times, there increases the number of times of performing the asynchronous processing for exchanging the request signal and the reception signal for the transfer for mutually issuing notices on the start, reception and end of the transfer. Hence, as shown in FIG. 7D, when the number of such transfer times is increased too much, the overall transfer time will be lengthened on the contrary. As a clock frequency ratio of the transmission-side device 3 and the reception-side device 4 increases, an asynchronous processing period (the number of clocks) will also be lengthened, and accordingly, this will cause the overall transfer time to be further lengthened. From this, the optimal burst length of shortening the overall transfer time to the maximum differs depending on the clock frequency ratio of the transmission-side device 3 and the reception-side device 4.

An asynchronous processing period T2 can be calculated according to a circuit configuration (operating specifications) the asynchronous processing. Hence, the overall amount of data and burst length, which are related to the transfer, and the time taken for the asynchronous processing are formulated, whereby the total transfer time to be expected can be estimated. The read controller A 14 calculates in advance such a burst length that shortens the total transfer time to the maximum in the clock frequency ratio of the transmission-side device 3 and the reception-side device 4. Then, every time of sensing a change of a setting of the operation frequency following a change of an operating mode, and the like, the read controller A 14 sets an appropriate burst length according to the clock frequency ratio of the transmission-side device 3 and the reception-side device 4. Making of such a setting always enables high-speed transfer.

A specific calculation example of the total transfer time is shown below. Note that a mechanism of performing this calculation may be incorporated into the data transfer device 1, or calculations may be separately executed in advance in combinations of operating clocks which can be taken, and only results thereof may be incorporated as a table into the data transfer device 1.

In FIG. 7, T1 is a time taken to store the unit data, which are transmitted from the transmission-side device 3, in the FIFO storage device 11 to the same number as that of the set burst length, T2 is a time from when the transfer request TR is issued from the read controller A 14 to the reception-side device 4 until the reception-side device 4 recognizes the transfer request TR, and T3 is a time until the reception-side device 4 receives the unit data with the same number as that of the set burst length.

FIG. 7A shows a total transfer time when the burst length is set to the same number as the maximum number of words (the number of the unit data) N of the data which can be stored in the FIFO storage device 11. When the burst length b that can be taken is set to N, N÷2, N÷4 and N÷8, FIG. 7B shows a case where the burst length b is set to N÷2, and the data is received while being bisected. FIGS. 7C and 7D show cases where the burst length b is set to N÷4 and N÷8 in a similar way.

Such pieces of the total transfer time in FIGS. 7A, 7B, 7C and 7D are defined as t(1), t(2), t(3) and t(4), respectively. t(1), t(2), t(3) and t(4) are represented as in the following Equations (1) to (4) by using T1, T2 and T3 for each thereof. In the case of FIG. 7A, $$t(1)=T1+T2+T3 \qquad \text{Equation (1)}$$

In the case of FIG. 7B, $$t(2)=T1\div2+2\times T2+2\times T3\div2 \qquad \text{Equation (2)}$$

In the case of FIG. 7C, $$t(3)=T1\div4+4\times T2+4\times T3\div4 \qquad \text{Equation (3)}$$

In the case of FIG. 7D, $$t(4)=T1\div8+8\times T2+8\times T3\div8 \qquad \text{Equation (4)}.$$

These calculations are performed along the flowchart shown in FIG. 5. To T1, T2 and T3, real numbers are assigned on the basis of the frequency ratio of the transmission side and the reception side (details will be described later).

From Steps S20 and S21 in FIG. 5, the transfer time at the maximum burst length N becomes t(1). In Step S22, the transfer time at the bisected burst length becomes t(2).

Moreover, the difference M (corresponding to M in FIG. 7B), which is taken in Step S23, is represented as in Equation (5) shown below.

$$M=t(1)-t(2)=T1+T2+T3-(T1\div2+2\times T2+2\times T3\div2)=T1\div2-T2 \qquad \text{Equation (5)}$$

M≥0 in Step S24 means that the transfer time is improved. Accordingly, while passing through Step S25 similarly thereafter, the calculation is repeated like t(2)−t(3), t(3)−t(4), . . . from the second largest burst length (N÷2 in this example), and at the point of time when M<0 is established, a burst length at the previous point of time (t(3) in this example) is determined as the optimal burst length (Step S26).

An example of obtaining T1, T2 and T3 as specific numeric values is shown below. In this embodiment, the transmission-side device 3 operates at a higher speed than the reception-side device 4, and accordingly, such a clock relationship as shown in FIG. 7 is formed. A cycle time of the clock signal of the transmission-side device 3 is defined as C1, and a cycle time of the clock signal of the reception-side device 4 is defined as C2. When the clock of the transmission-side device 3 is taken as a reference, a ratio f of the cycle time is represented by Equation (6) shown below.

$$f=C2\div C1 \qquad \text{Equation (6)}$$

Equation (6) means that the reception-side device 4 operates in an operating cycle (the frequency is an inverse thereof) that is f times (f>1) that of the transmission-side device 3.

The time T1 taken until the data from the transmission-side device 3 is stored in the FIFO storage device 11 can be represented by the following Equation (7).

$$T1=C1\times N \qquad \text{Equation (7)}$$

With regard to the time T2 taken for the asynchronous processing, a time C2 taken to issue the transfer request TR from the read controller A 14, a maximum time (2×C2) for performing the asynchronous processing for the transfer request, and a maximum time C2 taken to receive the transfer request by the reception-side device 4 are added together, whereby Equation (8) is established.

$$T2 = 4 \times C2 \quad \text{Equation (8)}$$

Note that an asynchronous processing period for releasing the transfer request is concealed by a data reception period, and can be ignored with respect to the calculation of the transfer processing time.

The time T3 taken for the read controller B 15 to read data from the FIFO storage device 11 and transmit the same to the reception-side device 4 and taken for the reception-side device 4 to receive the data can be represented by the following Equation (9).

$$T3 = C2 \times N = C1 \times f \times N \quad \text{Equation (9)}$$

C1, C2 and f are uniquely determined when the clock frequencies of the transmission-side device 3 and the reception-side device 4 are determined. Accordingly, on the basis of the flowchart shown in FIG. 6, the total transfer time can be calculated by taking, as a reference, N in which the burst length b is the same in number as the capacity of the FIFO storage device 11.

The above description shows a method of obtaining the minimum value of the total transfer time while changing the division number of the transfer target data. However, not limited to this, the division number by which the total transfer time Ttotal at the time of transferring the transfer target data into a plurality of data and transferring the same is minimized may be obtained in the following manner. Herein, the total transfer time Ttotal is represented by the speed ratio f of the clock signals, the transfer target data length N and the division number k.

In the case of division by k, generalization of Equations (1) to (4) is represented as follows.

$$Ttotal = T1/k + k \cdot T2 + T3 \quad \text{Equation (10)}$$

From Equations (7) to (9), T1=C1·N, T2=4×C2, and T3=C1·f·N are established, and accordingly, Equation (10) is represented as Equation (11).

$$Ttotal = C1 \cdot N/k + k \times 4 \times C2 + C1 \cdot f \cdot N \quad \text{Equation (11)}$$

A minimum value of Ttotal with respect to k is obtained. When Ttotal is differentiated by k, and a solution thereof is set to 0, then established are:

$$-(C1 \cdot N)/k2 + 4 \times C1 \cdot f = 0 \quad \text{Equation (12)}$$

$$\therefore k = (N/4f)^{1/2} \quad \text{Equation (13)}$$

k obtained in Equation (13) may also be a non-integer, and in that case, either of integers before and after the obtained k just needs to be set to the division number. Note that, when N and f are predefined values, then in order to avoid complexity of arithmetic operations, combinations of N and f may be tabulated, and k may be obtained so as to be indexed.

Meanwhile, FIG. 8 is a second timing chart of the burst transfer. The second timing chart is a timing chart of the burst transfer when the transmission-side device 3 operates at a slower clock frequency than the reception-side device 4. Like FIG. 7, each case in FIG. 8 shows a total transfer time when the burst length is set to the burst length with the same number as the maximum number of the data N which can be stored in the FIFO storage device 11. When the burst length b that can be taken is set to N, N÷2, N÷4 and N÷8, FIG. 8B shows a case where the burst length is set to N÷2, and the data is received while being bisected. FIGS. 8C and 8D show cases where the burst length b is set to N÷4 and N÷8 in a similar way.

Incidentally, when the operating speed on the transmission side is low, the way of calculation differs from that in the case of FIG. 7. The reception side will have to wait for such transmission-side data to be stored in the FIFO storage device 11 by the predetermined burst number. Accordingly, in order to transfer all data at the highest speed, the last one transfer must be started at the same time when all the transmission-side data are finished being stored in the FIFO storage device 11. The respective illustrations in FIG. 8 show examples of this. As apparent from FIGS. 8A, 8B and 8C, as the burst length is shorter, the total transfer time is shortened. However, when the burst length is too short, a total of pieces of the asynchronous processing time becomes longer than the same as shown in FIG. 8D, and a time loss W occurs until the last one transfer is started. Hence, such a condition is added that the time taken for the asynchronous processing does not exceed the time until the data storage is finished (details will be described later).

Herein, T4 is a time taken until all the data are stored from the transmission-side device 3 into the FIFO storage device 11. Moreover, T5 is a time from when the read controller A 14 issues a transfer request for the last one transfer to the reception-side device 4, and issues a transmission instruction for the last one transfer to the read controller B 15 until when the transfer request and the transmission instruction are recognized by the reception-side device 4 and the read controller B 15. Further, T6 is a time from when the read controller B 15 reads the unit data with the same number as the set burst length from the FIFO storage device 11 and transmits the unit data to the reception-side device 4 until when the reception-side device 4 receives the unit data.

Such pieces of the total transfer time in FIGS. 8A, 8B, 8C and 8D are defined as t(11), t(12), t(13) and t(14), respectively. t(11), t(12), t(13) and t(14) are represented as in the following Equations (14) to (17) by using T4, T5 and T6 for each thereof.

In the case of FIG. 8A, $$t(11) = T4 + T5 + T6 \quad \text{Equation (14)}$$

In the case of FIG. 8B, $$t(12) = T4 + T5 + T6 \div 2 \quad \text{Equation (15)}$$

In the case of FIG. 8C, $$t(13) = T4 + T5 + T6 \div 4 \quad \text{Equation (16)}$$

In the case of FIG. 8D, $$t(14) = T4 + T5 + W + T6 \div 8 \quad \text{Equation (17)}$$

As in the case of FIG. 7, the pieces of the total transfer time are compared with one another along the flowchart of FIG. 6, and a best burst length is obtained. Next, an example of actually obtaining T4, T5 and T6 as numeric values is shown below. In this embodiment, the reception-side device 4 operates at a higher speed than the transmission-side device 3. A cycle time of the clock signal of the transmission-side device 3 is defined as C3, and a cycle time of the clock signal of the reception-side device 4 is defined as C4. When the clock of the transmission-side device 3 is taken as a reference, a ratio fa of the cycle time is represented by the following Equation (18).

$$fa = C4 \div C3 \quad \text{Equation (18)}$$

Equation (18) means that the reception side operates in an operating cycle (the frequency is an inverse thereof) that is fa times (fa<1) that of the transmission side.

As in the example of FIGS. 7, T4, T5 and T6 can be represented by the following Equations (19) to (21).

$$T4 = C3 \times N \quad \text{Equation (19)}$$

$$T5 = C4 + 3 \times C4 = 4 \times C4 \quad \text{Equation (20)}$$

$$T6 = C4 \times N = C3 \times fa \times N \quad \text{Equation (21)}$$

Moreover, as a restriction for preventing such a case where the total of the pieces of the asynchronous processing time becomes longer as shown in FIG. 8D mentioned above, it is necessary that a data storage time for one burst of the transmission-side device 3 be longer than a shortest time T7 taken for one burst transfer of the reception-side device 4. That is, by using the burst length b at the time t(n), T7 can be represented as in Expression (22).

$$T7 < C3 \times b \quad \text{Expression (22)}$$

The time T7 taken for the asynchronous processing is a shortest time to finish one piece of the reception processing. That is, the time T7 is composed of the time T5 taken to issue the transfer request, the time C4×b taken for the data transfer for one burst, and the time C4×Z taken to release the transfer request. Accordingly, Equation (23) is established.

$$T7 = T5 + C4 \times b + C4 \times Z \quad \text{Expression (23)}$$

Expression (24) is established from Expressions (22) and (23).

$$C4 \times 4 + C4 \times b + C4 \times Z < C3 \times b \therefore b > (4+Z) \times C4/(C3-C4) \quad \text{Expression (24)}$$

Hence, such a burst length b in which the transfer time is minimized by the flowchart of FIG. 6 just needs to be determined, the burst length b being added with a condition where the burst length b as a result of the data division into the plurality of data is equal to or more than a predetermined value determined from the speed ratio fa of the clock signals, for example, a condition that satisfies Expression (24).

According to the data transfer device 1 according to the first embodiment described above, even if a part of the transfer target data is lost in the case of dividing the transfer target data into a plurality of pieces and transferring the same, the burst length is adjusted, whereby such a situation can be avoided where the number of the unit data intended to be transmitted becomes insufficient. As a result, the interruption of the data transfer due to the standby for the data reception, and the like can be prevented, and eventually, the data which are not properly transferred can be reduced.

As described above, it is important to reduce the data which are not properly transferred, and is extremely important particularly in the case where each of the transfer target data is significant from viewpoint of safety. For example, when the transfer target data is data for use in automatic control for an automobile, a robot and the like, or data of a security sensor, a security camera and the like, the fact that the data which are not property transferred are a little is extremely important since the fact results in reliability improvement of the related technologies.

Second Embodiment

A data transfer method as an embodiment of the present application will be described. A data transfer method according to this embodiment is a data transfer method in a data transfer device that divides transfer target data and transfers divided pieces of the data in a burst manner from a transmission-side device to a reception-side device, including: storing one piece of input transfer target data; performing data transfer at a set burst length as a data length of divided data when the one piece of the transfer target data is divided by a first division number until a part of the one piece of the transfer target data is sensed to be lost; and when a part of the one piece of the transfer target data is sensed to be lost, adjusting a burst length so that a data length of the one piece of the transfer target data with a lost part coincides with a total of data lengths of data to be transferred.

According to the data transfer method according to the second embodiment as described above, as in the first embodiment, the interruption of the data transfer can be prevented even if a part of the transfer target data is lost in the case of dividing the transfer target data into a plurality of data and transferring the same.

The respective embodiments of the present invention have been described above; however, the present invention is not limited to the above-described embodiments, and incorporates a variety of modified examples. Moreover, the above-described embodiments are those described in detail in order to clearly explain the present invention, and are not necessarily limited to those including all the described components. Further, it is possible to replace a part of components of a certain embodiment by components of the other embodiments, and it is also possible to add the components of the other embodiments to the components of a certain embodiment. All of these are incorporated in the scope of the present invention. Further, numeric values, messages and the like, which are included in the text and the drawings, are merely examples, and do not damage the effects of the present invention even if those different from the above are used.

What is claimed is:

1. A data transfer device that divides transfer target data and transfers divided pieces of the data in a burst manner from a transmission-side device to a reception-side device, comprising:

a storage device; and
a control device,
wherein the control device executes:
storage processing for controlling the storage device to store one piece of input transfer target data;
first transfer processing for controlling the storage device so that data transfer is performed at a set burst length as a data length of divided data when the one piece of the transfer target data is divided by a first division number until a last part of the one piece of the transfer target data is sensed; and
second transfer processing for controlling the storage device, when the last part of the one piece of the transfer target data is sensed, to adjust a burst length so that a data length of the one piece of the transfer target data coincides with a total of data lengths of data to be transferred, and to transfer the data at the adjusted burst length,
wherein, for each piece of unit data which constitute the one piece of the transfer target data, the unit data and an end signal that indicates whether or not the unit data is last unit data are input from the transmission-side device to the storage device,
wherein the storage processing is
processing for controlling the storage device to store, for each of a plurality of the unit data which constitute the one piece of transfer target data, the unit data and a flag in association with each other, the flag indicating whether or not the unit data is the last unit data,
wherein the first transfer processing is
processing for controlling the storage device so that untransmitted unit data stored in the storage device and identified by referring to the flags stored in the storage device are transmitted to the reception-side device at the set burst length when a number of the untransmitted unit data is equal to or more than the set burst length, and wherein the second transfer processing is
processing for controlling the storage device, when the number of the untransmitted unit data is less than the set burst length, so that the burst length is adjusted to transmit the untransmitted unit data with the number to the reception-side device, and so that the untransmitted unit data are transmitted to the reception-side device at the adjusted burst length.

2. The data transfer device according to claim 1,
wherein the storage device stores data in which the unit data are accompanied by the flags.

3. The data transfer device according to claim 1,
wherein, at a time of adjusting the burst length in the second transfer processing, one or a plurality of values are selected from among values smaller than the set burst length so that larger values are given higher priorities, and each of the selected values is defined as the burst length.

4. The data transfer device according to claim 1,
wherein, based on an operating speed of the transmission-side device, an operating speed of the reception-side device, and the data length of the transfer target data, the first division number is obtained so that a time taken to transfer the transfer target data becomes shorter than in a case of transferring the transfer target data without dividing the transfer target data.

5. A data transfer method in a data transfer device that divides transfer target data and transfers divided pieces of the data in a burst manner from a transmission-side device to a reception-side device, the data transfer method comprising:

storing one piece of input transfer target data wherein, for each piece of unit data which constitute the one piece of the transfer target data, the unit data and an end signal that indicates whether or not the unit data is last unit data are input from the transmission-side device, wherein, for each of a plurality of the unit data which constitute the one piece of transfer target data, the unit data and a flag in association with each other is stored, and wherein the flag indicating whether or not the unit data is the last unit data;

performing data transfer at a set burst length as a data length of divided data when the one piece of the transfer target data is divided by a first division number until a last part of the one piece of the transfer target data is sensed; and when the last part of the one piece of the transfer target data is sensed, adjusting a burst length so that a data length of the one piece of the transfer target data coincides with a total of data lengths of data to be transferred, wherein untransmitted unit data stored in the storage device and identified by referring to the flags are transmitted to the reception-side device at the set burst length when a number of the untransmitted unit data is equal to or more than the set burst length, and wherein, when the number of the untransmitted unit data is less than the set burst length, the burst length is adjusted to transmit the untransmitted unit data with the number to the reception-side device, and so that the untransmitted unit data are transmitted to the reception-side device at the adjusted burst length.

* * * * *